United States Patent
Ottliczky

(10) Patent No.: US 8,231,397 B2
(45) Date of Patent: Jul. 31, 2012

(54) HYBRID UNIVERSAL DISTRIBUTION SYSTEM COMPRISING ELECTRICAL, FLUID, AND COMMUNICATION FUNCTIONS

(75) Inventor: Martin Ottliczky, Forchtenberg-Ernstbach (DE)

(73) Assignee: Buerkert Werke GmbH, Ingelfingen (DE)

( * ) Notice: Subject to any disclaimer, the term of this patent is extended or adjusted under 35 U.S.C. 154(b) by 294 days.

(21) Appl. No.: 12/602,830

(22) PCT Filed: Jun. 4, 2008

(86) PCT No.: PCT/EP2008/004449
§ 371 (c)(1),
(2), (4) Date: Apr. 14, 2010

(87) PCT Pub. No.: WO2008/148541
PCT Pub. Date: Dec. 11, 2008

(65) Prior Publication Data
US 2012/0064745 A1 Mar. 15, 2012

(30) Foreign Application Priority Data
Jun. 5, 2007 (DE) .................... 20 2007 007 927 U

(51) Int. Cl.
*H01R 4/60* (2006.01)

(52) U.S. Cl. ..................................... 439/192; 137/884

(58) Field of Classification Search .......... 439/190–195; 137/884
See application file for complete search history.

(56) References Cited

U.S. PATENT DOCUMENTS

| | | | |
|---|---|---|---|
| 3,195,095 A | 7/1965 | Field | |
| 4,095,864 A * | 6/1978 | Hardin | 439/191 |
| 5,197,895 A * | 3/1993 | Stupecky | 439/194 |
| 5,637,006 A * | 6/1997 | Almeras | 439/191 |
| 6,173,731 B1 * | 1/2001 | Ottliczky | 137/271 |
| 6,598,279 B1 * | 7/2003 | Morgan | 29/402.08 |
| 6,685,491 B2 * | 2/2004 | Gergek | 439/191 |
| 6,832,622 B2 * | 12/2004 | Hassel et al. | 137/269 |
| 7,154,037 B2 * | 12/2006 | Brenner et al. | 174/21 JS |
| 7,819,345 B2 * | 10/2010 | Shoap | 239/588 |
| 7,849,880 B2 * | 12/2010 | Herges | 137/884 |
| 7,938,145 B2 * | 5/2011 | Phillips et al. | 137/884 |
| 2001/0003289 A1 * | 6/2001 | Mead et al. | 137/884 |
| 2002/0013077 A1 * | 1/2002 | Lepine et al. | 439/191 |
| 2002/0132505 A1 * | 9/2002 | Gergek | 439/192 |
| 2002/0186666 A1 * | 12/2002 | Hassel et al. | 370/257 |
| 2003/0100209 A1 * | 5/2003 | Kerscher et al. | 439/191 |
| 2004/0256127 A1 * | 12/2004 | Brenner et al. | 174/21 R |
| 2009/0307405 A1 * | 12/2009 | Ottliczky | 710/305 |

FOREIGN PATENT DOCUMENTS

| | | |
|---|---|---|
| DE | 41 08 082 A1 | 9/1992 |
| DE | 43 43 958 A1 | 7/1995 |
| DE | 298 20 933 U1 | 5/2000 |
| DE | 201 19 352 U1 | 4/2002 |

(Continued)

*Primary Examiner* — Ross Gushi
(74) *Attorney, Agent, or Firm* — Tarolli, Sundheim, Covell & Tummino LLP

(57) ABSTRACT

A distributor for supplying consumers of an industrial plant with electricity and with fluid and for transmitting communication signals from and to the consumers has separate feed connections for supplying electricity and fluid as well as a collective line for communication signals. It further has a plurality of identical hybrid plug connectors which include plug connector elements for electric power supply, for fluid supply, and for communication signals and which are in communication with the corresponding feed connections and with the collective line, respectively.

11 Claims, 6 Drawing Sheets

FOREIGN PATENT DOCUMENTS

| | | |
|---|---|---|
| DE | 103 54 147 A1 | 6/2005 |
| DE | 10 2004 033 567 A1 | 1/2006 |
| EP | 1 011 159 B1 | 6/2000 |
| WO | WO 2006/096122 A1 | 9/2006 |

* cited by examiner

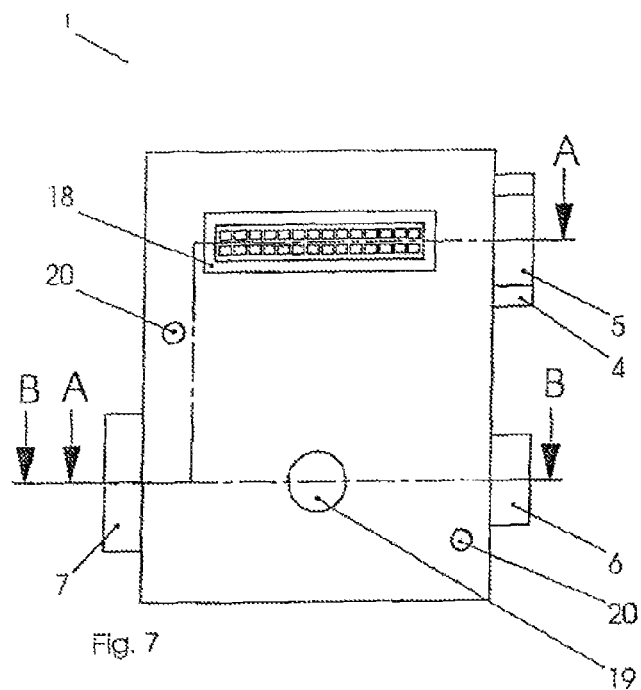
Fig. 7
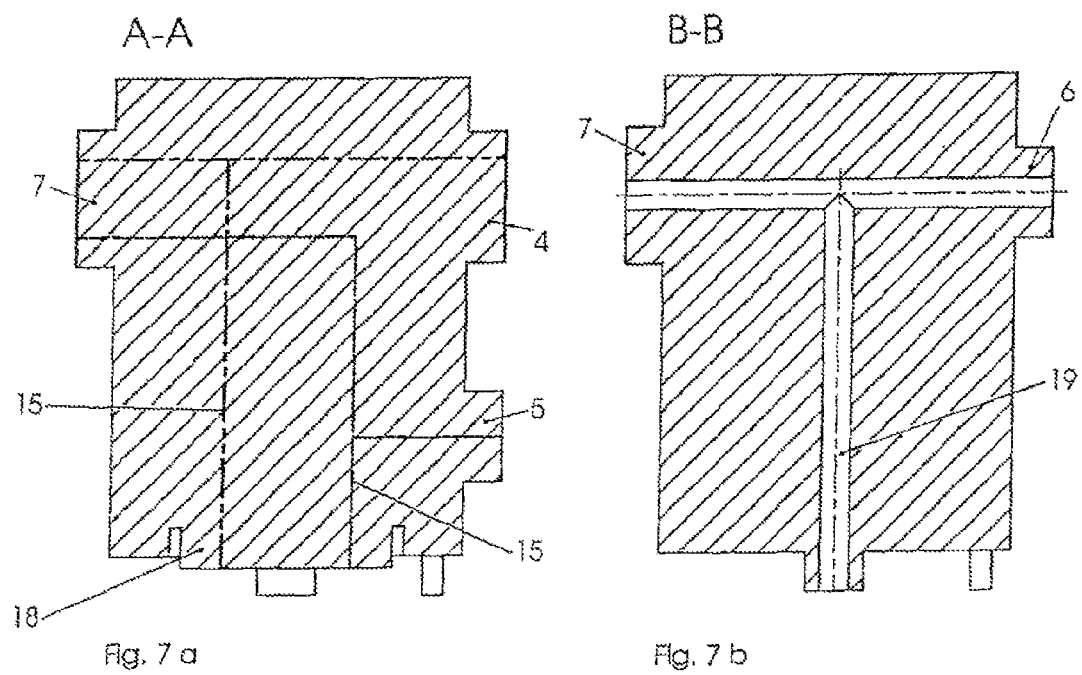
Fig. 7a
Fig. 7b

HYBRID UNIVERSAL DISTRIBUTION SYSTEM COMPRISING ELECTRICAL, FLUID, AND COMMUNICATION FUNCTIONS

FIELD OF THE INVENTION

The present invention relates to a distributor for supplying electricity and fluid to consumers of an industrial plant and for transmitting communication signals from and to the consumers.

BACKGROUND OF THE INVENTION

In plant construction in the most varied of industries such as pharmaceutical, chemical or food industries, devices at the actuator level such as, e.g., control valves are linked with supply systems (power supply, controlling means, compressed air) by complex installations. Frequently, a multitude of actuators are each connected with lines leading to a plurality of supply sources, which results in a confusing structure of the plants.

Power and communication lines and hoses for compressed air or other fluids need to be laid over large distances and connected to the individual components using T-joints, for example. This easily creates a tangle of cables and hoses.

With this type of wiring system, there is a very high risk of error, while at the same time trouble-shooting is, of course, difficult and involved.

High installation costs are incurred. Qualified technical staff are required for commissioning, maintenance and operation of such plants.

Individual components can only be tested or pretested involving great expense.

In modern installation practice for plant engineering, distributor modules are therefore already made use of These distributor modules are limited to purely electrical functions. Thus, the installation expenditure is thereby simplified only partly.

A hybrid cable is known from robotics which allows data transfer, compressed air supply and voltage supply in equal measure. It would be desirable to be able to employ this type of cable between the actuator level and the supply level in plant construction.

SUMMARY OF THE INVENTION

It is the object of the present invention to provide a hybrid universal distributor system having any desired number of identical interfaces, in which at least three different functions such as power supply, distribution of communication signals, or compressed air supply are together led to one shared interface via which one actuator each can be completely supplied with power, control signals and, for example, compressed air by means of just one single connection.

According to the invention, this is achieved by a distributor for supplying electricity and fluid to consumers of an industrial plant and for transmitting communication signals from and to the consumers, including
- separate feed connections for supplying electricity and fluid as well as a collective line for communication signals; and
- a plurality of identical hybrid plug connectors which include plug connector elements for electric power supply, for fluid supply, and for communication signals, and which are in communication with the corresponding feed connections and with the collective line, respectively.

Advantageous further developments of the distributor are specified in the dependent claims.

In the distributor according to the invention, different functions are united with one another in universal units.

The commissioning of complex plants is greatly simplified by Plug and Play with the aid of the invention described here. A simple assembly without any special tools is possible.

Downtimes and maintenance times are minimized since, on the one hand, errors are avoided and, on the other hand, are easier to locate, and the individual components can be easily exchanged and pretested.

An advantage of the distributor system described here is that it allows installations to be standardized.

Depending on requirements, a desired fluid can be made available to the actuators; the fluid may be compressed air, hydraulic fluid or any other desired medium. The actuators may be, for example, control valves, cylinders or others.

A surface with few raised and depressed portions of the universal distributor system makes cleaning easier. This system is suitable for applications in harsh environments. It may be implemented in a high degree of protection, for example IP68.

It is compatible with all modem communication technologies such as field bus, wireless, optical transmission, ASI, etc.

The invention may be employed to particular advantage if the actuators involved are miniaturized devices because this allows the number of device interfaces to be considerably reduced, i.e. this miniaturized device only needs to be equipped with one connection via which the supply of electricity, compressed air and the data transfer takes place. Until now, a minimum size of the actuator had been defined by the space required for the interfaces.

The hybrid universal distributor system may be fixedly provided with a defined number of connections for the components to be transmitted such as, for example, electricity, communication signals, and compressed air and with a likewise defined number of hybrid plugs each of which is suitable for connection of any desired actuator.

In a further exemplary embodiment, the hybrid universal distributor system is of a modular design. Here, any desired number of connecting modules can be fitted together depending on the number of actuators desired.

A universal distributor system according to the invention is suitable both for wall mounting and for section mounting.

In a further development of the universal distributor system, provision is made for integration of one or more shutoff valves. This permits supply circuits to be formed in a simple manner.

The passive modules described here may be upgraded at any time to form active modules by including further functions such as field bus or diagnostics. This makes additional controlling possible.

In a further exemplary embodiment, a known distributor system which already has electricity supply and communication integrated therein may be connected upstream of the universal distributor system according to the invention. These two functions are expanded by compressed air in the universal distributor system and are jointly brought together to the hybrid plugs.

BRIEF DESCRIPTION OF THE DRAWINGS

Further features and advantages of the invention will be apparent from the description below and from the drawings, to which reference is made and in which:

FIG. 7 shows a master module 1 in a top view;

FIGS. 7a, b show a section taken through the master module 1;

FIGS. 8a, b show a section taken through the distributor module 2.

DESCRIPTION OF PREFERRED EMBODIMENTS

Figure 1:
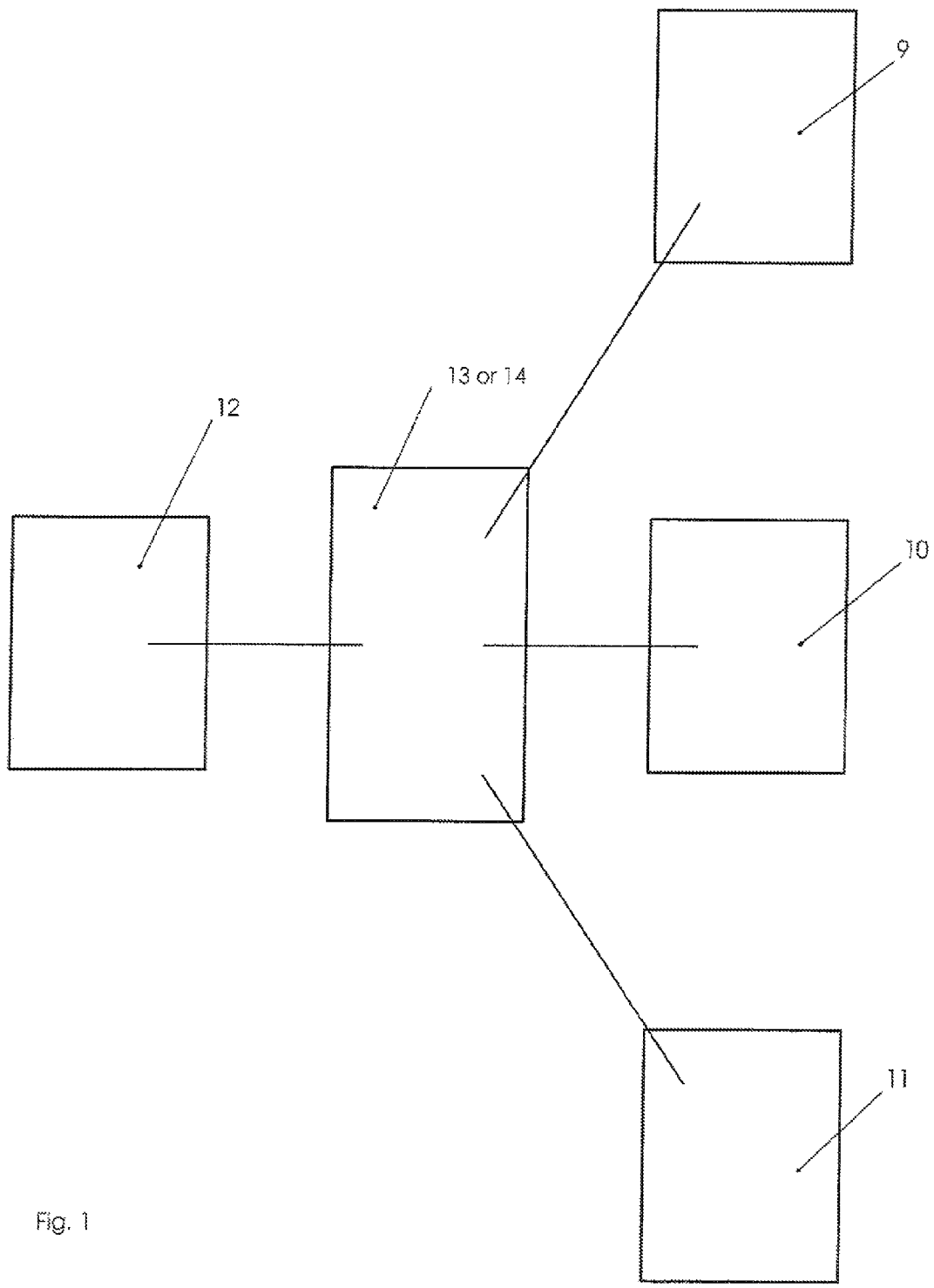
FIG. 1 shows a schematic illustration of the function of the universal distributor system according to the invention within an industrial plant.
Figure 2:
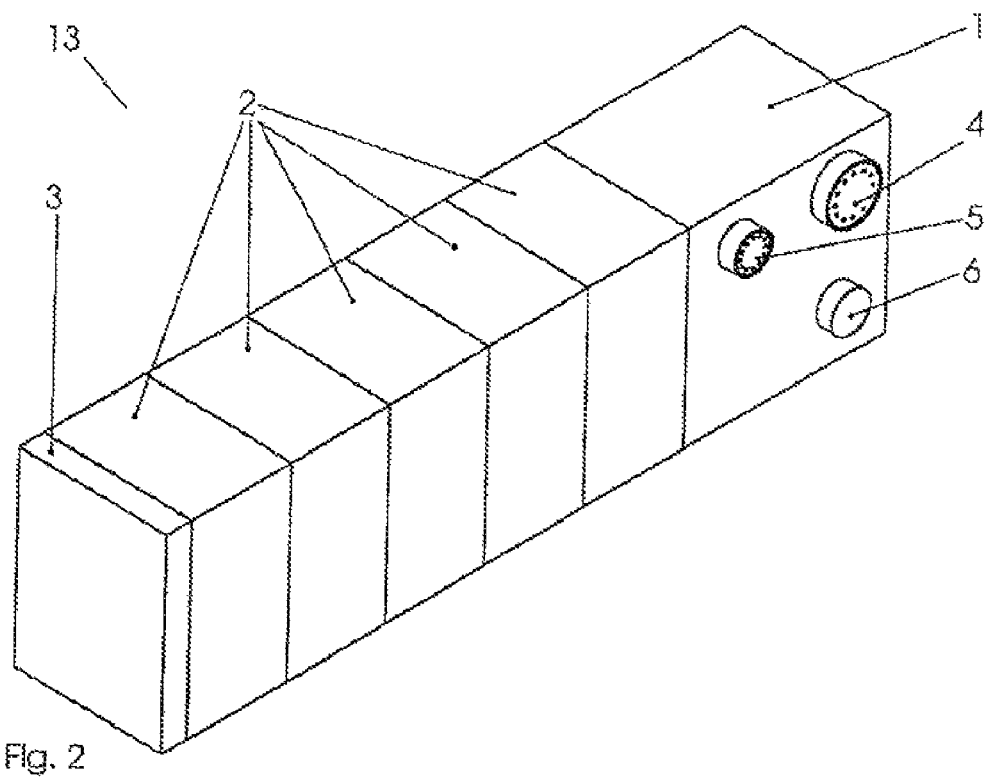
FIG. 2 shows a universal distributor system having a modular structure.
Figure 3:
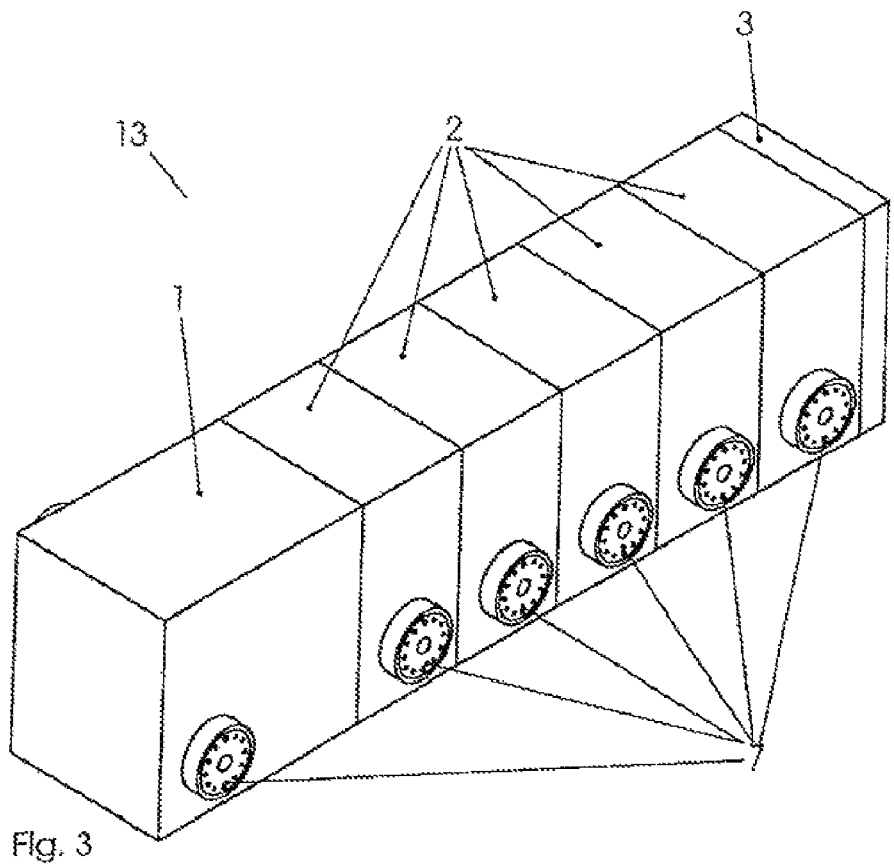
FIG. 3 shows a rear view of a universal distributor system having a modular structure.
Figure 4:
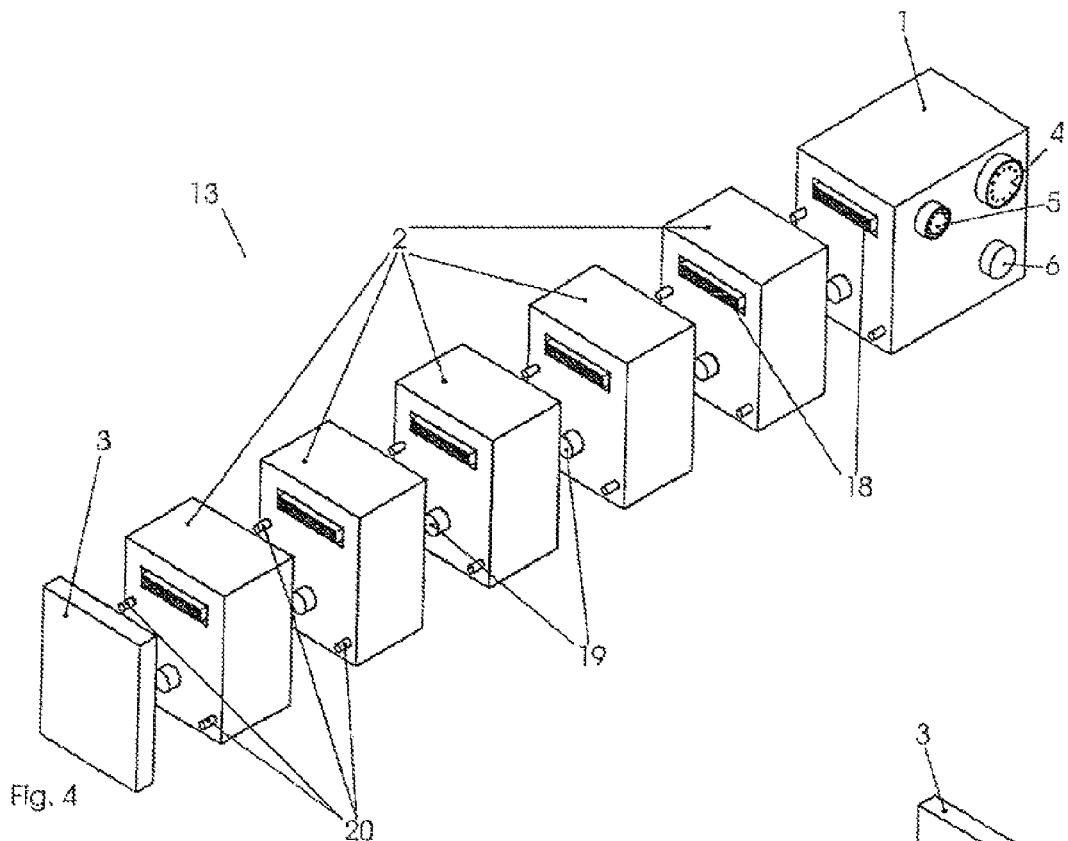
FIG. 4 shows an exploded illustration of FIG. 2.
Figure 5:
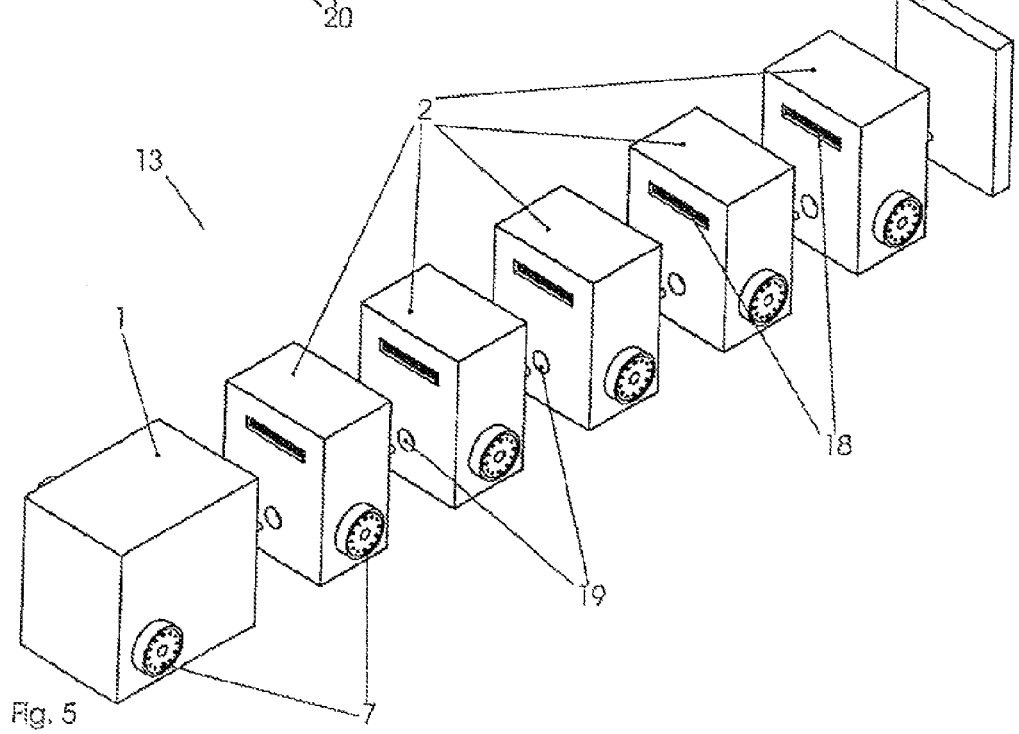
FIG. 5 shows an exploded illustration of FIG. 3.

FIG. 1 schematically illustrates the organization of the universal distributor system according to the invention within an industrial plant. The universal distributor system 13 or 14 is connected to at least three functions such as compressed air supply 9, controlling means 10, and power supply 11. These three functions are brought together within the universal distributor system 13 or 14 and are jointly passed on to identical interfaces in the universal distributor system. An actuator 12 can now be connected to an interface of the universal distributor system by means of only one single hybrid cable; the actuator is supplied with electricity, compressed air, and communication signals via this interface.

When the stationary hybrid universal distributor system 14 is used, the maximum number of actuators that can be connected corresponds to the number of hybrid plugs 7 provided.

When employing the hybrid universal distributor system 13 having a modular structure, the number of hybrid plugs 7 may be variably increased in accordance with the number of actuators desired by fitting the distributor modules 2 in line with one another.

As is apparent from the illustrations in FIGS. 1 to 4, the modularly structured hybrid universal distributor system 13 is made up of a master module 1, any desired number of distributor modules 2, and a closing plate 3.

These parts are firmly connected with each other by connecting members 20 by simply putting, snapping or clipping them together in one spatial direction starting from one side.

The master module 1 is of a substantially cuboid structure. A connector for the power supply 4, a fluid inlet 6, a connector for communication transmission 5, and a hybrid plug 7 are arranged on one or more faces.

The hybrid plug 7 is provided with electrical contacts, contacts for data transfer, and one or more fluidic channels.

Provided inside the master module 1 there is an electric collective channel 18 which is connected via channels 15 to the connector for the power supply 4, to the connector for communication transmission 5, to the adjacent distributor module 2 fitted in line, and to the hybrid plug 7.

Similarly, extending inside the master module 1 there is a collective channel 19 for fluids which is connected via connecting channels 15 to the fluid inlet 6, the adjacent distributor module 2 fitted in line, and to the hybrid plug 7.

Like the master module 1, the distributor modules 2 are of a substantially cuboid structure.

Two faces facing each other are connected by an electric collective channel 18 and the fluid channel 19.

The distributor modules 2 are connected with each other by means of the connecting members 20 in such a way that both the electric collective channel 18 and the fluid channel 19 form common channels continuing into each other.

Both the electric collective channel 18 and the fluid channel 19 are connected via channels 15 with the hybrid plug 7 which is located on a face of the distributor module 2.

Figure 6:
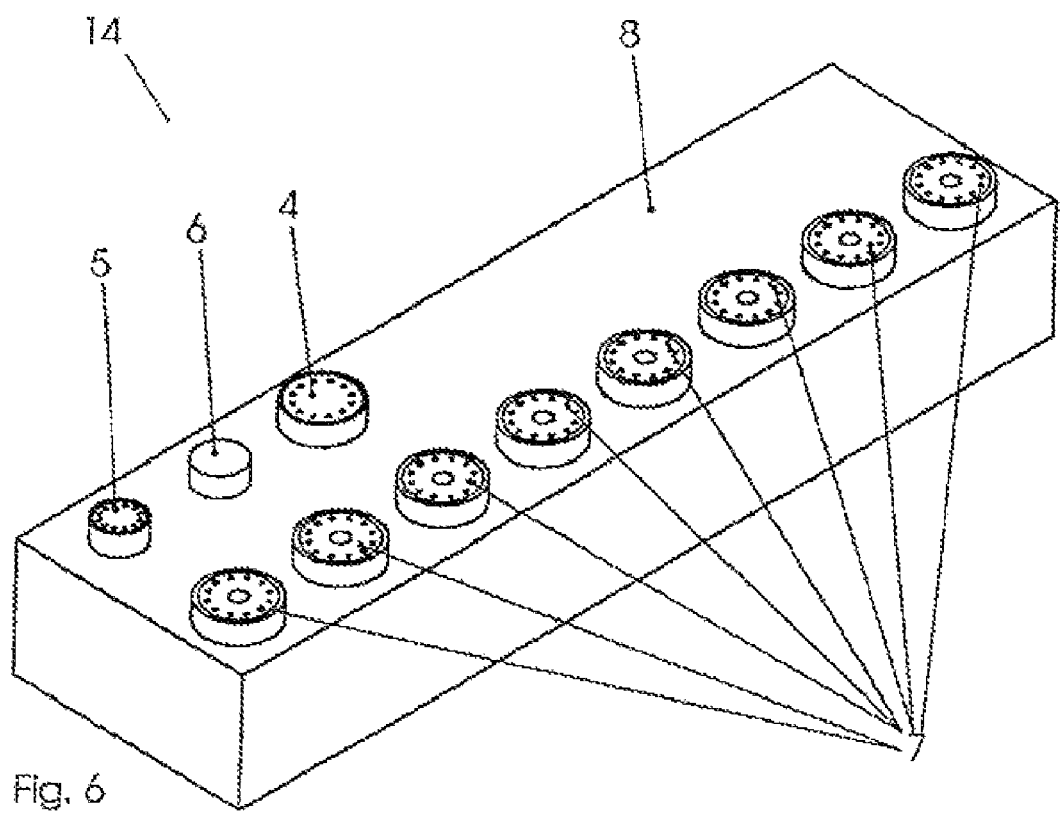
FIG. 6 shows a stationary universal distributor system.
Figure 8:
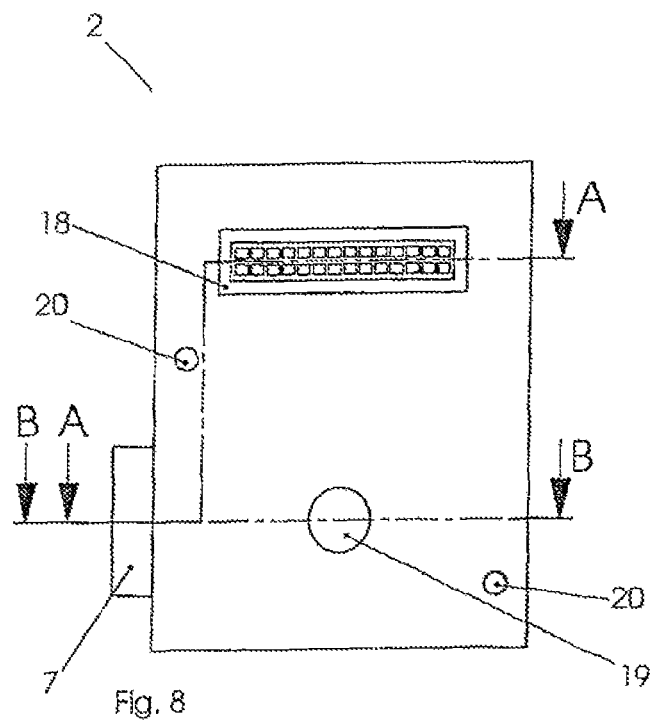
FIG. 8 shows a distributor module 2 in a top view.
Figure 8:
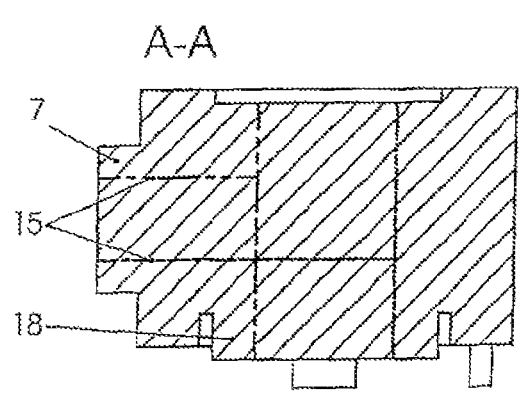
Figure 8:
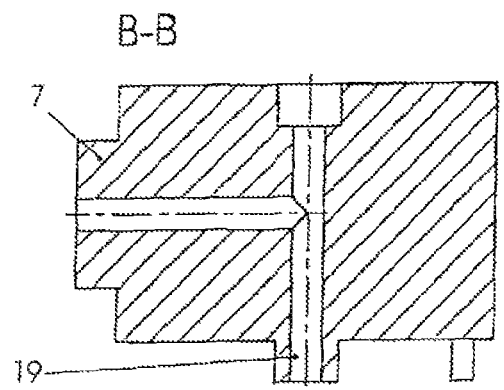

A further exemplary embodiment is illustrated as a stationary universal distributor system 14 in FIG. 6.

A connector for the power supply 4, a fluid inlet 6, a connector for communication transmission 5, and a plurality of like hybrid plugs 7 are arranged on one or more faces of the housing 8.

As in the modularly structured universal distributor system 13, extending inside the housing 8 there are a fluid channel 19 which is connected with the fluid inlet 6 and each hybrid plug 7, and an electric collective channel 18 which is connected to the power supply 4, the connector for data transfer 5 and to each hybrid plug 7.

The connector for communication transmission 5 is compatible with any desired communication technologies such as, e.g., field bus, wireless or ASI.

The invention claimed is:

1. A distributor for supplying electricity and fluid to consumers of an industrial plant and for transmitting communication signals from and to the consumers, comprising:
   separate feed connections for supplying electricity and fluid as well as a collective line for communication signals: and
   a plurality of identical hybrid plug connectors which include plug connector elements for electric power supply, for fluid supply, and for communication signals and which are in communication with the corresponding feed connections and with the collective line, respectively.

2. The distributor according to claim 1, wherein the feed connections and the collective line are combined with the hybrid plug connectors in a distribution cabinet.

3. The distributor according to claim 1, wherein the communication signals are transmitted via a bus system.

4. The distributor according to claim 1, implemented in a high degree of protection such as according to the IPSB standard.

5. The distributor according to claim 1, wherein the feed connections and the collective line are formed on a master module and the master module is coupled to distributor modules each of which includes at least one hybrid plug connector.

6. The distributor according to claim 5, wherein the distributor modules are connected with each other and with the master module by plug connectors so as to be fitted in line.

7. The distributor according to claim 6, wherein the distributor modules each include a hybrid plug connector on an end face and the plug connectors on two parallel side faces perpendicular to the end face.

8. The distributor according to claim 7, wherein the side faces of the distributor modules include connecting members for a mechanical connection between the modules.

9. The distributor according to claim 5, wherein the plug connectors on the side faces of the modules have contacts for the power supply combined with contacts for the communication signals within a collective channel proceeding from the master module and traversing the distributor modules.

10. The distributor according to claim 9, wherein the side faces of the modules have fluidic plug connectors arranged in alignment thereon for a fluid channel proceeding from the master module and passing transversely through the distributor modules.

11. The distributor according to claim 5, wherein the master module also includes at least one hybrid plug connector.

* * * * *